(12) United States Patent
Asselot et al.

(10) Patent No.: US 10,353,080 B2
(45) Date of Patent: Jul. 16, 2019

(54) METHOD AND DEVICE FOR THE SPATIAL AND TEMPORAL TRACKING OF EXPOSURE TO RISKS

(71) Applicant: CONSEILS ET ETUDES EN RADIOPROTECTION, Octeville (FR)

(72) Inventors: Daniel Asselot, Carquebut (FR); Jean-François Greuez, Urville Nacqueville (FR); Jacques Petry, Cherbourg (FR)

(73) Assignee: CONSEILS ET ETUDES EN RADIOPROTECTION, Octeville (FR)

( * ) Notice: Subject to any disclaimer, the term of this patent is extended or adjusted under 35 U.S.C. 154(b) by 166 days.

(21) Appl. No.: 15/325,710

(22) PCT Filed: Jul. 13, 2015

(86) PCT No.: PCT/EP2015/065929
§ 371 (c)(1),
(2) Date: Apr. 4, 2017

(87) PCT Pub. No.: WO2016/012290
PCT Pub. Date: Jan. 28, 2016

(65) Prior Publication Data
US 2017/0205512 A1    Jul. 20, 2017

(30) Foreign Application Priority Data
Jul. 11, 2014 (FR) .................................. 14 56760

(51) Int. Cl.
*G01T 1/02* (2006.01)
*G01T 7/00* (2006.01)
(Continued)

(52) U.S. Cl.
CPC ............... *G01T 1/02* (2013.01); *G01T 7/00* (2013.01); *H04N 5/44504* (2013.01);
(Continued)

(58) Field of Classification Search
CPC ... G01T 1/00; G01T 1/02; G06F 3/038; G06F 15/18; G06F 21/33; A61B 5/0476; H04N 1/32507; H04N 5/30; H04L 26/06843
(Continued)

(56) References Cited

U.S. PATENT DOCUMENTS 5,235,318 A * 8/1993 Schulcz .................... G01T 1/02
                                                            250/336.1
5,286,973 A * 2/1994 Westrom .................. G01T 7/00
                                                            250/253
(Continued)

FOREIGN PATENT DOCUMENTS

EP    0 542 561 A1    5/1993
WO    2006/017796 A2  2/2006
(Continued)

OTHER PUBLICATIONS

Boudergui et al., "Development of a drone equipped with optimized sensors for nuclear and radiological risk characterization," 2011 2nd International Conference on Advancements in Nuclear Instrumentation Measurement Methods and their Applications (ANIMMA), Jun. 6, 2011, pp. 1-9, IEEE.

*Primary Examiner* — Thai Q Tran
*Assistant Examiner* — Syed Y Hasan
(74) *Attorney, Agent, or Firm* — Im IP Law; C. Andrew Im; Chai Im (57) ABSTRACT

A system to supervise an operator working in an environment exposed to ionizing radiation. A supervision center includes a processor, memory, screen and network connection facility. A radiation detector/meter connected to the operator obtains and transmits a measurement of the exposure intensity to the supervision center. A radiofrequency tag connected to the detector/meter provides geolocation of the detector/meter. The memory stores a map of the exposed environment including a map of the exposure intensity, and (Continued)

a history file containing a record of the measurement, the date of the measurement and the location of the detector corresponding to the measurement. The memory stores a planning file containing a list, duration, location and scheduling of the operator tasks. A connecting terminal is connected to the network and provided to the operator.

15 Claims, 3 Drawing Sheets

(51) Int. Cl.
    *H04N 5/445* (2011.01)
    *H04N 7/18* (2006.01)
    *H04N 1/32* (2006.01)
    *H04L 29/06* (2006.01)

(52) U.S. Cl.
    CPC ......... *H04N 7/18* (2013.01); *H04L 29/06823* (2013.01); *H04N 1/32507* (2013.01)

(58) Field of Classification Search
    USPC ............... 250/336.1, 394; 358/408; 600/544; 706/14; 713/182; 726/19
    See application file for complete search history.

(56) References Cited

U.S. PATENT DOCUMENTS

| | | | |
|---|---|---|---|
| 5,572,027 A | | 11/1996 | Tawil et al. |
| 6,591,300 B1 * | | 7/2003 | Yurkovic ............... G06Q 10/10 709/202 |
| 2002/0167445 A1 * | | 11/2002 | Eden ........................ G01S 3/36 342/451 |
| 2005/0081044 A1 * | | 4/2005 | Giles ....................... H04L 63/08 713/182 |
| 2007/0096037 A1 * | | 5/2007 | Shapiro ................... G01T 1/167 250/394 |
| 2009/0012745 A1 | | 1/2009 | Longman et al. |
| 2012/0154170 A1 | | 6/2012 | Kahilainen et al. |
| 2013/0063550 A1 * | | 3/2013 | Ritchey ................... G16H 40/63 348/36 |
| 2013/0325357 A1 | | 12/2013 | Walerow et al. |
| 2014/0063561 A1 * | | 3/2014 | Endoh ................. H04N 1/32122 358/408 |

FOREIGN PATENT DOCUMENTS

| | | |
|---|---|---|
| WO | 2006/018630 A2 | 2/2006 |
| WO | 2006/086749 A2 | 8/2006 |

\* cited by examiner

METHOD AND DEVICE FOR THE SPATIAL AND TEMPORAL TRACKING OF EXPOSURE TO RISKS

RELATED APPLICATIONS

This application is a § 371 application from PCT/EP2015/065929 filed Jul. 13, 2015, which claims priority from French Patent Application No. 14 56760 filed Jul. 11, 2014, each of which is incorporated herein by reference in its entirety.

FIELD OF THE INVENTION

The invention relates to a method and device for monitoring risk exposure in space and time. The invention is more particularly but not exclusively dedicated to the monitoring and surveillance of the risk of exposure to ionizing radiation during work by personnel in areas subjected to such radiation. However, the invention may be adapted to all types of exposure, particularly to chemicals, which could lead to unwanted effects on the exposed personnel or property, due to the total dose effect.

BACKGROUND OF THE INVENTION

When work is being done in a site exposed to ionizing radiation, particularly for the purpose of maintenance, security or dismantling, a person or object subjected to said radiation is monitored by means of an individual detector, such as a dosimeter, to determine the quantity of radiation received. Besides, automatic measuring devices or beacons are used to collect data and obtain a map of the intensity of exposure on the site. The information is particularly used to organize and plan the work, particularly shift rotation, the number of persons, the resources required and the time for carrying out a job depending on the resources available and the risks to which the resources are exposed, on the basis of relevant physiological, technical and legislative data.

Before any work on a site subjected to ionizing radiation, a provisional dosimetry evaluation is carried out from readings taken in the working area by radiation protection technicians, such as dose rate measurements and contamination measurements. These measurements are copied to a map, known as the initial map. Then, at each stage of the work during which the conditions of exposure could be modified, a map is prepared once again. The making of such an updated map involves stopping the work and bringing radiation protection technicians back on the site to take the measurements once again.

All site workers are equipped with a dosimeter that makes it possible to measure the quantity of radiation received. The open working time of each person is calculated theoretically, from the map and their area of work, based on a provisional dosimetry evaluation, and corrected if needed from the data relating to the dose effectively received by the person, obtained from their dosimeter. That actual exposure is observed after the event. Thus, this method of planning of the prior art does not make it possible to make optimum use of the resources in respect of the exposure and the dose received by them. The uncertainty about the actual exposure makes it necessary to apply a safety margin in view of standards.

Document U.S. Pat. No. 5,572,027 describes a dosimeter that combines a dosimeter known as an active dosimeter, adapted to measure a dose rate, and a dosimeter known as a passive dosimeter, adapted to measure a quantity of radiation received.

Document U.S. 2012 0154170 describes an individual dosimeter adapted to communicate in real time with a supervision station and thus determine the radiation dose received by the wearer of said dosimeter.

Document EP 0 542 561 describes a measuring device that can measure the radiation intensity values in an environment and superimpose them on an image of said environment so as to inform an operator of the exposure risks.

These devices of the prior art allow the passive supervision of the exposure of resources. The supervision is known as passive because it does not allow real time monitoring or control of the dose received by the person, particularly as a function of the variation of the dose rate to which they are subjected in view of their location in the working zone. Now, operators are limited in terms of the total dose received over a long period, for example over a year, in the case of exposure to ionizing radiation. Thus, with the supervision devices of the prior art, it is possible for an operator to be unnecessarily exposed in view of their location and task, while moving said operator by a few meters would be enough to save the potential of the resource.

OBJECT AND SUMMARY OF THE INVENTION

The invention aims to remedy the drawbacks of the prior art and therefore relates to a system for supervising an operator working in an environment that is exposed, particularly to ionizing radiation, which system comprises:

a. a supervision center comprising a processor, memory means, display means and means for accessing a network;

b. a personal detector, particularly a radiation meter, connected to the operator and adapted to obtain a measurement suitable for determining the intensity of the exposure and comprising means for addressing said measurement on the network to the supervision center;

c. a map of the exposed environment, saved in the memory means and comprising a map of the intensity of exposure;

d. means for geolocating the personal detector comprising identification means connected to said detector, particularly a radiofrequency tag;

e. a file known as the history file, saved in the memory means and comprising a record of the measurement, the date of the measurement and the location of the detector corresponding to the measurement;

f. a connecting terminal connected to the network and provided to the operator.

Thus, the measurement from the detector makes it possible to update the map and monitor the exposure received by the operator depending on their location on the site, and the system allows the dynamic supervision of the exposure of the operator. The connecting terminal makes it possible to communicate with the operator so as to inform them of adverse situations in respect of their exposure.

The invention can be implemented advantageously in the embodiments described below which may be considered individually or in any technically operative combination.

Advantageously, the system according to the invention comprises:

g. a file known as the planning file, saved in the memory means and comprising the list, duration, location and scheduling of the tasks of the operator.

Thus, the device according to the invention makes it possible to compare the potential of the resources working on the site at any time, depending on the planning of the work.

Advantageously, the system according to the invention comprises:

h. a fixed detector adapted to measure an intensity of exposure and connected to the network, with a fixed location in the environment, which targets an area in said environment.

Thus, the fixed detector continuously monitors a particular area.

Advantageously, the system according to the invention comprises:

j. a mobile device suitable for measuring an intensity of exposure, mobile in the environment and comprising geolocation means.

Thus, the mobile measuring device provides, on demand or according to an established schedule, an evaluation of the exposure in a particular area of the environment, for example because said area is poorly covered by a fixed detector or because of the movement of the operator, or because the area necessitates regular and systematic measurements.

Advantageously, the device according to the invention comprises:

k. a video monitoring camera connected to the network, which monitors an area of the environment.

Thus, said camera allows the supervisor to observe, in real time or later on, the configuration of the area monitored by said camera and the activity in the area, particularly in order to compare the activity of an operator in view of their exposure, and to monitor if the exposure is appropriate for the task carried out.

In one exemplary embodiment, the connecting terminal is a tablet computer. Thus, the operator receives personalized visual data and information, particularly a map, from the supervision station and interacts with said supervision station.

In another exemplary embodiment, the connecting terminal is an optical augmented reality device, particularly a helmet visor. Thus, the operator is constantly informed of the intensity of exposure in the space in which they are working and the dose to which they have been exposed.

In another exemplary embodiment, the connecting terminal is a connected watch.

In that last embodiment, the system according to the invention comprises:

l. proximity communication terminals adapted to connect to the local network and to connect the watch to the local network.

Thus, said terminals make it possible to send on to the operator's connected watch specific information from the local network, when the operator is located close to said terminals, and thus depending on their location in the working environment.

The invention also relates to a method for implementing a system according to any of its embodiments described above, which method comprises the steps of:

i. acquiring a map, known as the initial map, of the intensity of exposure in the environment and saving it in the memory means;

ii. acquiring, at a first frequency, the information from the personal detector associated with the geolocation information of said detector and saving them in the history file;

iii. processing the data contained in the history file using the processor and obtaining:

iii.a an update of the map at a second frequency that is smaller than the first frequency and saving that update;

iii.b an update of the exposure information of the operator at a third frequency that is smaller than the first frequency, and saving that update in an operator monitoring file;

iv. displaying the updated data on the display means of the supervision station.

Thus, the method allows the supervisor to obtain a regularly refreshed overview of the spatial situation in terms of the intensity of exposure. The processing of data from the detectors of the operators working in the environment makes it possible to obtain a photograph of the spatial distribution of the exposure in the environment, and also to analyze the change in that exposure over time, and thus detect incidents. Monitoring the operators working in the environment in space and time and monitoring their exposure makes it possible to optimize the management of resources depending on the tasks to complete and the resulting exposure.

Advantageously, the method according to the invention uses a system comprising a planning file and comprises a step of:

v. acquiring an initial planning and saving it in the planning file.

Thus, the supervisor is able to compare the exposure of operators in view of the task carried out and the tasks remaining to be carried out at all times.

Advantageously, the method according to the invention uses a system comprising a fixed detector and comprises the steps of:

vi. acquiring a measurement of the intensity of exposure in the area covered by the fixed detector at a fourth frequency;

vii. updating the map from the information acquired in step (vi).

Thus, the measurement by the fixed detector and the measurements from the personal detectors are correlated in order to refine the map.

Advantageously, the method according to the invention uses a system comprising a mobile measuring device and comprises steps of:

viii. moving the mobile measuring device up to a determined location in the environment;

ix. acquiring a measurement of the exposure taken by the mobile measurement device;

x. updating the map from the measurement taken in step (ix).

Thus, the mobile measuring device makes it possible to achieve reliable measurements in an area of the environment that is not covered by personal detectors or a fixed detector, for example, a passage area where the time spent by operators is insufficient for obtaining a reliable measurement, or to compensate for a fixed detector providing seemingly incorrect measurements, for example because an object or operator is screening off the measurement.

Advantageously, the method according to the invention comprises a step of:

xi. transmitting information from the supervision station to the connecting terminal.

Thus, the operator is continuously a connected with the supervision station and has a summary of information relating to their position, allowing them to improve their productivity and improving their health and safety conditions.

Advantageously, the method according to the invention comprises a step of:

xii. displaying information from the video monitoring camera on the display means of the supervision station.

Thus, the supervisor monitors the working conditions in real time.

In one embodiment of the method according to the invention:
the first period for transmitting measurements corresponding to the first frequency is less than 1 second;
the refresh period corresponding to the second and third frequency is less than 5 seconds.

Thus, the information from the personal detectors makes up for its inferior precision by a great number of measurements, which are processed, particularly by averaging, to make them more robust.

Advantageously, the period corresponding to the fourth frequency is smaller than 10 seconds and the processing carried out in step (iv) incorporates the exposure measurement taken by the fixed detector.

Advantageously, the method according to the invention comprises steps of:
xiii. acquiring the geolocation of the personal detector at a fifth frequency that is greater than the first frequency;
xiv. computing the speed of movement of the operator to which said detector is connected.

Thus, the measurements obtained in areas where the operator is moving too fast for reliable measurement are not taken into account.

More precisely, in an advantageous embodiment, the method according to the invention comprises, before the recording of step (ii) of data from the personal detector, a data consistency test that takes account of the movement speed of the operator and several successive measurements of their geolocation. Thus, measurements that do not correspond to movements that can be made physically by an operator are considered to be aberrant and are not taken into account.

Advantageously, the processing step (iv) incorporates the measurement obtained by the mobile device. Thus, the method according to the invention combines the different measurements to obtain a true view of the conditions of exposure in the environment without requiring an interruption of the work to obtain the information.

Advantageously, the step (iv) of processing in the method according to the invention comprises grouping the measurements by location and by date and processing the measurements in the groups obtained in that way. Thus, the method according to the invention combines a large number of measurements, both in space and in time, in order to obtain a true view of the situation that is regularly refreshed.

Advantageously, the method according to the invention comprises a step of:
xv. transmitting to the operator's connected watch information that colors their screen in a color that reflects the intensity of exposure of the map in the area in which the operator is located.

Thus, the operator is informed of the intensity of their exposure by transmitting a very small quantity of information.

BRIEF DESCRIPTION OF THE DRAWINGS

The invention is described below in its preferred embodiments, which are not limitative in any way, and by reference to FIGS. 1 to 3, wherein.

DETAILED DESCRIPTION OF THE EMBODIMENTS

Throughout the document, the terms "exposure" and "dose" are synonymous, as are the terms "dose rate" and "intensity of exposure".

Figure 1:
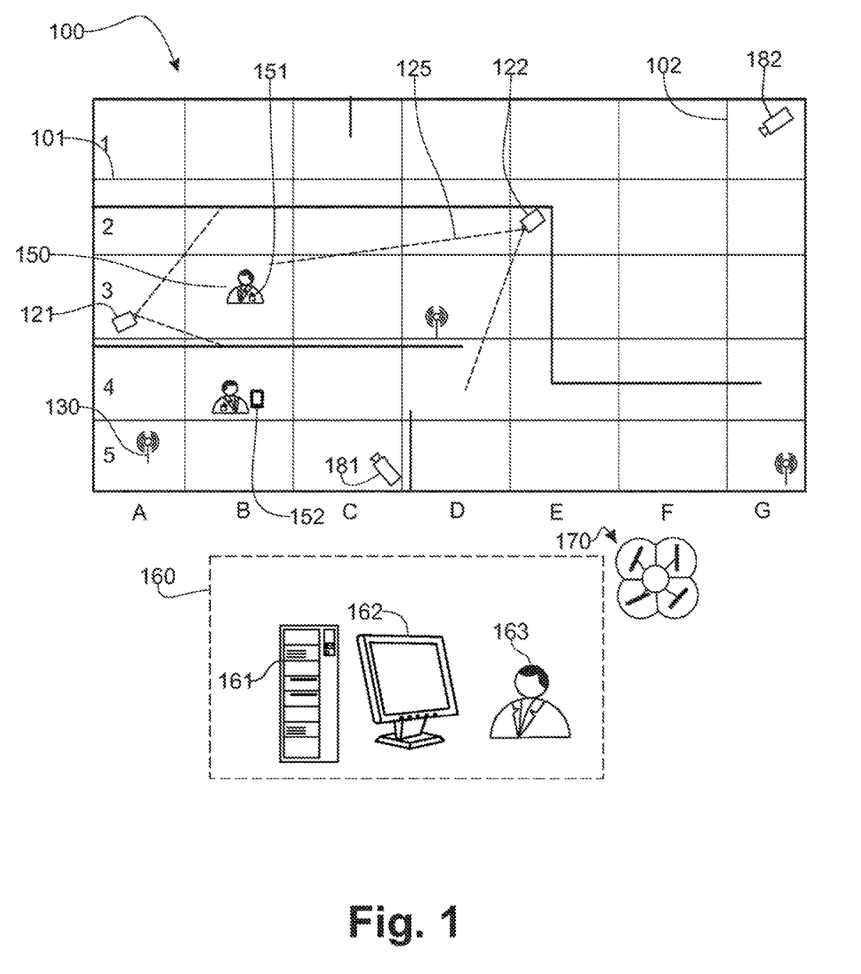
FIG. 1 is a top view of an exemplary working environment that is mapped using the device and method according to the invention.

In FIG. 1, the invention is described here in an environment subjected to ionizing radiation; however, the method and device according to the invention can be adapted to environments subjected to all types of exposure, particularly chemical and biological (gas, pathogens etc.) or physical (noise, temperature etc.), where the exposure is measurable by personal detectors. The invention is also described in the case of supervision of a human operator; the operator may alternatively be a robot. Lastly, for the purpose of convenient representation, the application of the method and device according to the invention is shown in a flat representation of the working environment (100), but the invention is perfectly suitable for three-dimensional spatial representation of the environment, and for taking account of three-dimensional spatial exposure.

The working environment (100) is monitored by a supervisor (163) located at a supervision station (160), which is separate, even remote from said working environment (100). In this exemplary embodiment, the supervisor (163) receives information about the working conditions via a computer device (161, 162) comprising a computer (161) connected by a network to the different devices that can be found in the working environment (100), and display means (162). The computer (161) comprises a processor, memory means and drivers to manage a local network and control the display means (162). Through the local network, the supervisor (163) also communicates with the different devices and the operators (150) present in the working environment.

In an exemplary embodiment of the method according to the invention, the working environment (100) is divided into areas, here by a grid of horizontal and vertical lines (101, 102) in the plane. The map of the working area is obtained from a plan or a three-dimensional model of the working site, by surveys carried out in the field prior to the work, or by a combination of those means.

In this exemplary embodiment, each area or set of areas thus demarcated is covered, firstly by one or more fixed beacons or detectors (121, 122) that measure the intensity of exposure, each in a definite volume (125) of visibility, and by a geolocation device comprising, in this exemplary embodiment, antennas (130) that interact with a radiofrequency tag or RFID tag (not shown) carried by each operator and by each detector present in the working environment (100). In one exemplary embodiment, each fixed beacon (121, 122) comprises an RFID tag that allows it to be precisely located in space. Each operator (150) present in the working space (100) carries a personal detector (151), for example a dosimeter that can measure the total exposure or preferably a radiation meter that makes it possible to measure an intensity of exposure, that is to say a flow; thus, said detector is suitable for measuring the intensity of exposure. Said personal detector comprises an RFID tag. Each measuring device is connected to the local network or LAN, connected to the computer means (161) of the supervision station (160). In a non-limitative exemplary embodiment, the local network is a wireless network using the WI-FI® protocol.

A mobile measuring device (170), here a drone, also connected to the local network, makes it possible to obtain a measurement of the exposure at a precise point. In another embodiment, the mobile measuring device is made up of an operator carrying a specific measuring device and connected by radio to the supervision station (160). The starting of the mobile measuring device is decided by the supervisor (163), particularly on the basis of the information displayed on the display means (162) of the supervision station.

In another embodiment, the mobile measuring device (170) such as a robot is adapted to move independently in all or part of the working environment. In this embodiment, said mobile device comprises its own means for location or for recognizing the environment in the working environment, means for measuring the intensity of exposure and memory means. Thus, the device is adapted to take geolocated and dated measurements of the intensity of exposure in areas of the working environment, recording them in its internal memory with the date and their location and then transmitting the data to the computer (161) either by a direct connection with the computer or via the local network. Such a robot makes it possible, for example, to independently carry out planned tasks for measuring the intensity of exposure in particular areas, without having to send a radiation protection team for that purpose. For example, said robot measures the intensity of exposure in the locker rooms of operators during shift changes.

One or more video monitoring cameras (181, 182) connected to the supervision station (160) via the LAN network or a separate network allow the supervisor (163) to visually monitor the working space.

Each operator (150) is connected to the supervisor (163) and more generally to the supervision station (160) by a connecting terminal (152), connected to the LAN network, which makes it possible to exchange information between said terminal and the supervision station (160). In alternative embodiments, said connecting terminal takes the form of a collective screen, a tablet computer or a vision device, glasses or helmet visor, comprising an information display. In that last alternative embodiment, the display on the vision device makes it possible to superimpose information known as augmented reality information on the operator's vision (150). In a complementary and optional manner, each operator is connected by a radio to the supervisor (163).

Figure 2:
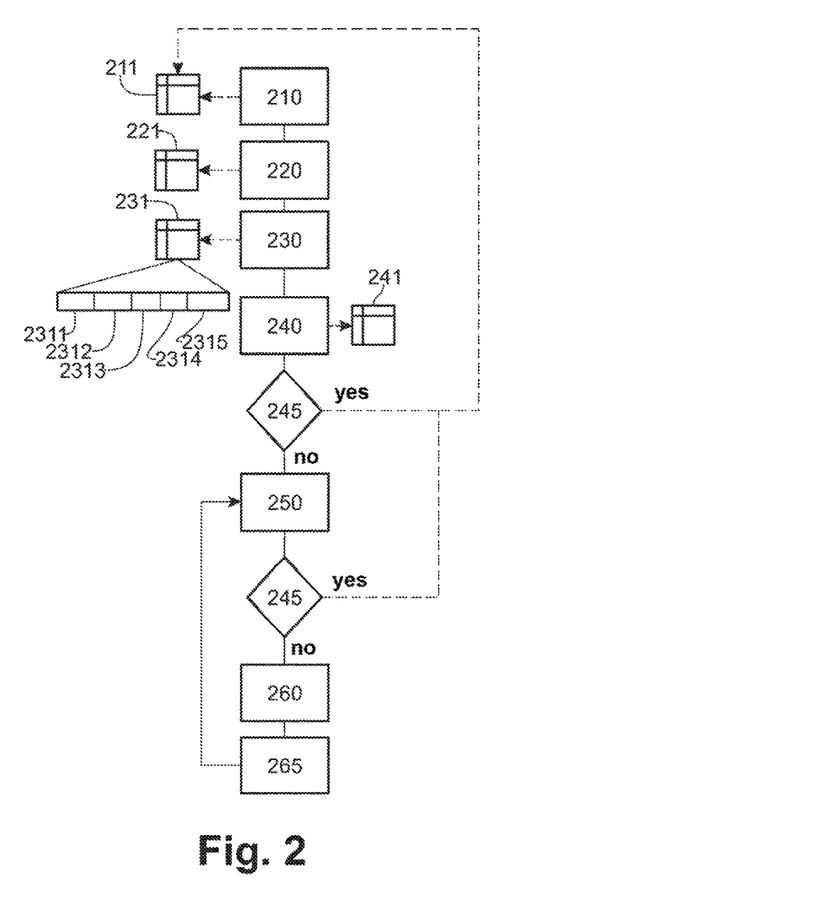
FIG. 2 is a logical diagram of an exemplary embodiment of the method according to the invention.

In FIG. 2 of a first implementation step (210) of the method according to the invention, an initial map of the exposure in the working environment is obtained by means of a radiation protection team sent out to the site, or through the use of fixed or mobile means (121, 122, 170, FIG. 1) present on the site. That initial reading provides a map of the exposure in the form of a value of the intensity of exposure in each area of the map demarcated by the grid. In a manner similar to the prior art, the initial map is used to plan the work initially, in a planning step (220). The initial map, the initial plan and the initial dosimetry targets are recorded in a map file (211) and a planning file (221) respectively. When the work starts, each operator involved in the initial plan is equipped with a personal detector and geolocation means. In an exemplary embodiment, every second, the computer at the supervision station receives information about the dose rate measured by each dosimeter present in the working environment via the LAN network, along with geolocation information corresponding to the place when the measurements were made. The computer at the supervision station acquires (230) the information and saves it in a file (231) known as the history file. Each record of the history file (231) comprises, for example, an operator identifier (2311), the measurement date (2312), the measurement location (2313), the value (2314) measured by the exposure measurement sensor and additional information (2315), known as setup information, such as the type of radiation meter that has taken the measurement. In an alternative embodiment, the information is placed in different files. In the context of the invention, the date identifies the exact moment in time of an event, that is to say the year, month, day and time, with the required accuracy.

The information recorded in the history file (231) is processed in the course of a processing step (240). In an exemplary embodiment, such processing comprises the grouping of measurements from the history file. The first grouping operation is carried out by operator and by date. That grouping provides, for a given operator, the intensity of exposure to which they have been subjected over time. The summation of that intensity over time, starting from an original date, makes it possible, in this exemplary embodiment, to determine the quantity of ionizing radiation to which that operator has been exposed up to the final date of the summation. Depending on the type of the personal detector, the dose received by the operator is extracted directly from the personal detector with no numerical summation. That result is stored in an operator monitoring file (241). A second measurement grouping operation is carried out by date and location. That is because operators present the working environment move in the areas that are initially demarcated. Thus, the measurements taken over time by means of the personal detectors are grouped according to the areas demarcated by the grid. Thus, the measurements are grouped for each area. As a non-limitative example, the measurement corresponding to the personal detectors is taken every 0.1 seconds, or at a frequency of 10 $s^{-1}$, and each area comprises a grouping of all the measurements taken in that area during a period of at least 1 second, known as the interpolation time. After that grouping and in this exemplary embodiment, a test (245) is carried out on the number of measurements taken in the area in question during that definite time, and possibly on the distribution of measurements in that area. As a non-limitative example, said test consists in making sure that at least 30 measurements have been taken in said area during the interpolation time and that said measurements are distributed within a perimeter demarcating a surface covering at least a third of the surface of the area. If those conditions are verified, the measurements grouped in that way are processed in order to determine the intensity of exposure in the area in question. Those conditions are given for guidance and are, in practice, determined by the nature of the exposure in the working site. The mapping file (211) is then updated for the area in question. As an example, the fixed detectors or beacons take a measurement every 10 seconds or at a measuring frequency of 0.1 $s^{-1}$. Those measures are less exposed to stochastic variations. The intensity of exposure in the area in question is computed by combining the measurements from the personal detectors and the measurements from the fixed detectors, by weighting the relative importance of said measurements, for example on the basis of the distance in time of the measurements and the date of evaluation of the update. Also in that exemplary embodiment, during a test step (255), the value of the intensity of exposure computed in that way in the area in question is compared with the previous value, obtained for that area. If the change between those two measurements remains within a pre-established proportion, the map (211) is updated. If the change is not within the permitted proportion, then an alarm is displayed in the area in question, which alarm informs the supervisor of a change that appears abnormal and suggests, for instance, the sending of a mobile device for a verification. In that case, the mobile measuring device is sent (260) to the area, acquires (265) a new measurement relating to said area, which is combined (250) with information from the other sensors in order to determine the intensity of exposure in said area and update the map.

In this exemplary embodiment, the acquisition frequency of the geolocation of the personal detector of an operator is carried out at a frequency which is sufficiently high, for example, above 20 $s^{-1}$, so as to compute the speed of movement of said operator, their path and their direction in the environment. That information is used to make the measurements reliable, for example by eliminating measurements where the time during which the operator passes in the area is too short for said measurements to be considered to be valid. In general, raw measurements from the detectors carried by the operators are filtered so as to eliminate measurement points that are deemed to be aberrant, taking account of geolocation and date information. Thus, for instance, two successive measurements from the same detector but separated by a distance that cannot physically be covered by an operator within the time separating them are considered to be aberrant and are not taken into account. Such a situation is likely to occur when two geolocation beacons close to each other are separated by an obstacle and successively receive the signal from the operator.

In practice, several operators are present and move in the working environment, so that even when measurements believed to be aberrant are removed, the quantity of information available is sufficient to establish and update the map.

Figure 3:
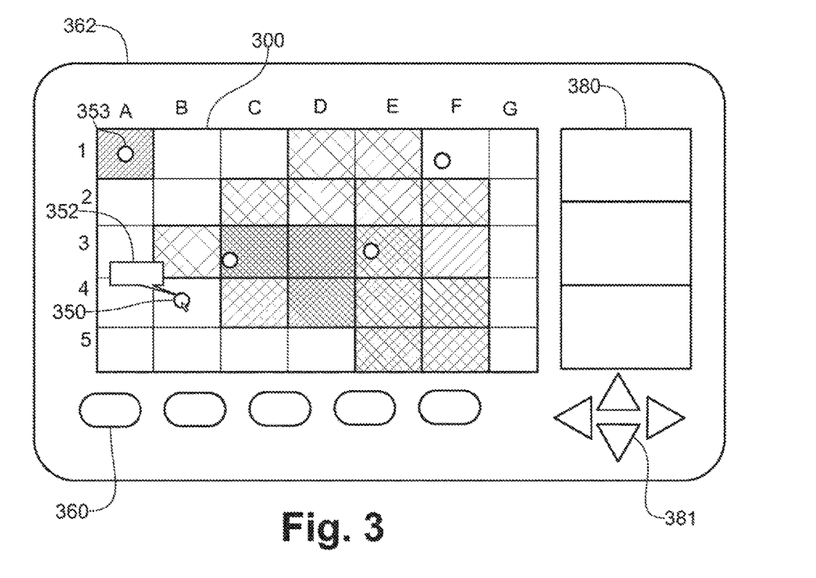
FIG. 3 is an exemplary embodiment of the display provided to the supervisor by the device according to the invention.

In FIG. 3, for establishing an updated exposure map, the volume of the monitored working environment is discretized into cells, for instance cubic cells (not shown). Thus, each flat area (A-1, D-3 etc.) of the map groups several cells in the projected volume of said area. The measurement made by a detector is located three-dimensionally, that is by its Cartesian coordinates on the plan, and also its altitude. Each measurement is dated. A map construction parameter defines a measurement validity time, for example 20 minutes. Thus, at the end of that validity time, the measurement is forgotten. The intensity of exposure in an area of the map, say D-3, is defined by combining the measurements obtained in the cells contained in the projected volume of the area, for example by considering the maximum intensity of exposure measured in that set of cells or with any other weighting of the measurements.

In an exemplary embodiment, the supervision screen (362) of the supervisor comprises a display of the map (300) of the environment, where areas are represented by colors illustrating the intensity of the exposure in said area. Each operator present in the working environment is represented on the map by a mark (350) depending on their location in said environment. When the supervisor clicks a mark, they obtain information (352) about said operator, particularly the task they are meant to carry out depending on the plan, their exact location, the radiation dose received, and the theoretical end of the task they are required to carry out. A display area (380) shows images from the video monitoring cameras, which can be turned by means of virtual buttons (381). Other virtual buttons (360) enable the supervisor to carry out other actions, for example send an alarm, or trigger the mobile detection device along a pre-established inspection circuit.

As an example, when an operator represented by their mark (353) is in an area (A-1) subjected to particularly high intensity, and the adjacent areas are not highly exposed, the supervisor clicks the corresponding mark (353) to view the nature of the task carried out by the operator and, where applicable, observes the actual occupation of the operator by means of the video monitoring cameras. If the occupation or the task being carried out does not require such exposure, the supervisor sends a message to said operator asking them to leave the area. Through video observation or by sending a mobile measuring device, the supervisor can also detect the origin of the exposure, particularly if it is not expected, for example following the movement of contaminated objects into the area.

In an exemplary embodiment, each operator working on the site has a connected terminal, for example a watch, connected either directly to the LAN network or through short-range communication terminals known as proximity terminals of the BLUETOOTH® or ZIGBEE® type placed in the working site, the screen of which is colored in the color corresponding to the intensity of exposure of the area on the map, when said operator is located in the corresponding physical area.

The description above and the exemplary embodiments show that the invention achieves its set objectives; in particular, the method and the device according to the invention make it possible to supervise, remotely and in virtual real time, an exposed work site.

To that end, the system made up of the method and the device according to the invention use the main functions below:
  geolocation: of operators, of intensity of exposure sensors and possible equipment operating on the working site, particularly robots or drones;
  communication and centralization of data
  computation of the map and conditions of exposure virtually in real time
  feedback to the operators working on the work site.

Thus, the system according to the invention particularly makes it possible to schedule and reschedule the work of persons involved on the site so that they can carry out as many tasks as possible within the limits of exposure permitted for those personnel. Thus, the device and method according to the invention allow the efficient use of the exposure potential of each person involved.

The invention claimed is:

1. A method for implementing a system to supervise an operator working in an environment exposed to an ionizing radiation, the system comprises a connecting terminal connected to the network and associated with the operator, a supervision center comprising a processor, a memory, a screen and a network connection facility to access a network, and a personal radiation detector connected to the operator and configured to obtain a measurement of an intensity of exposure and to transmit the measurement on the network to the supervision center, the method comprising the steps of:
  acquiring an initial map of an intensity of exposure in the environment and storing the initial map in the memory;
  acquiring, at a first frequency, information from the personal radiation detector and a geolocation information of the personal radiation detector using a radiofrequency tag connected to the personal radiation detector;
  storing the information from the personal radiation detector and the geolocation information in a history file stored in the memory, the history file comprises a record of the measurement, a date of the measurement and a location of the personal radiation detector corresponding to the measurement;

processing data contained in the history file by the processor to obtain and store an update of the initial map at a second frequency that is smaller than the first frequency in the memory, and to obtain and store an update of exposure information of the operator at a third frequency that is smaller than the first frequency in an operator monitoring file; and displaying the updated data on the screen of the supervision station.

2. The method according to claim 1, comprising a step of acquiring an initial plan and storing the initial plan in a planning file, the planning file comprises a list, duration, location and scheduling of tasks of the operator.

3. The method according to claim 1, comprising steps of acquiring a measurement of the intensity of the exposure in an area of the environment covered by a fixed detector at a fourth frequency, the fixed detector is in a fixed location in the environment and connected to the network; and updating the initial map with information acquired by the fixed detector.

4. The method according to claim 1, comprising steps of moving a mobile measurement device to a predetermined location in the environment to measure the intensity of the exposure; acquiring the measurement obtained by the mobile measurement device; and updating the initial map with the measurement acquired by the mobile measurement device.

5. The method according to claim 1, comprising a step of transmitting information from the supervision station to the connecting terminal.

6. The method according to claim 1, comprising a step of displaying information from a video monitoring camera on the screen of the supervision station, the video monitoring camera is connected to the network and is configured to monitor an area of the environment.

7. The method according to claim 6, wherein the information from the initial map is superimposed on the screen displaying the information from the video monitoring camera.

8. The method according to claim 1, wherein a first period for transmitting measurements corresponding to the first frequency is less than 1 second; and a refresh period corresponding to the second and third frequencies is less than 5 seconds.

9. The method according to claim 1, wherein a period corresponding to the fourth frequency is smaller than 10 seconds.

10. The method according to claim 1, further comprising steps of acquiring a geolocation of the personal radiation detector at a fifth frequency that is greater than the first frequency; and computing a movement speed of the operator connected to the personal radiation detector.

11. The method according to claim 10, further comprising, before the step of storing the information from the personal radiation detector in the history file, a step of performing a data consistency test to account for the movement speed of the operator and successive measurements of the geolocation of the personal radiation detector.

12. The method according to claim 3, wherein the step of processing data comprises a step of processing the measurement of the intensity of exposure acquired by the fixed detector.

13. The method according to claim 12, further comprising steps of moving a mobile measurement device to a predetermined location in the environment to measure the intensity of the exposure; acquiring the measurement obtained by the mobile measurement device; and wherein the step of processing data comprises a step of processing the measurement of the intensity of exposure acquired by the mobile measurement device.

14. The method according to claim 13, wherein the step of processing data comprises steps of grouping measurements by location and by date; and processing the measurements in groups.

15. The method according to claim 1, wherein the connecting terminal is a watch associated with the operator; and further comprising a step of transmitting information to the watch to color a screen of the watch in a color that reflects the intensity of the exposure in an area in which the operator is located.

* * * * *